(12) United States Patent
O'Connor et al.

(10) Patent No.: US 6,672,722 B2
(45) Date of Patent: Jan. 6, 2004

(54) PROJECTION ENGINE

(75) Inventors: Michael O'Connor, Cupertino, CA (US); Kenneth E. Salsman, The Woodlands, TX (US); Serge Rutman, Boulder Creek, CA (US)

(73) Assignee: Intel Corporation, Santa Clara, CA (US)

( * ) Notice: Subject to any disclaimer, the term of this patent is extended or adjusted under 35 U.S.C. 154(b) by 72 days.

(21) Appl. No.: 09/885,231

(22) Filed: Jun. 19, 2001

(65) Prior Publication Data

US 2002/0191235 A1 Dec. 19, 2002

(51) Int. Cl.⁷ .................. G03B 21/26; G03B 21/00; G03B 21/28; G03B 21/14
(52) U.S. Cl. .................. 353/34; 353/33; 353/81; 353/82
(58) Field of Search .................. 353/33, 34, 81, 353/82; 349/8, 9

(56) References Cited

U.S. PATENT DOCUMENTS

| | | | | |
|---|---|---|---|---|
| 5,028,121 A | * | 7/1991 | Baur et al. | 349/194 |
| 5,517,340 A | * | 5/1996 | Doany et al. | 348/742 |
| 5,575,548 A | * | 11/1996 | Lee | 353/31 |
| 5,798,819 A | * | 8/1998 | Hattori et al. | 349/9 |
| 5,982,541 A | * | 11/1999 | Li et al. | 349/9 |
| 6,144,420 A | * | 11/2000 | Jung | 349/5 |
| 6,183,091 B1 | | 2/2001 | Johnson et al. | |
| 6,217,174 B1 | | 4/2001 | Knox | |
| 6,309,071 B1 | * | 10/2001 | Huang et al. | 353/20 |
| 6,407,766 B1 | * | 6/2002 | Ramanujan et al. | 347/239 |

FOREIGN PATENT DOCUMENTS

| | | |
|---|---|---|
| EP | 0 922 986 A2 | 6/1999 |
| WO | WO 01/50178 A2 | 7/2001 |
| WO | WO 01/73485 A1 | 10/2001 |
| WO | WO 02/04994 A2 | 1/2002 |

* cited by examiner

Primary Examiner—Russell Adams
Assistant Examiner—D. Ben Esplin
(74) Attorney, Agent, or Firm—Trop, Pruner & Hu, P.C.

(57) ABSTRACT

A projection engine having a first kernel for modulating light of a first polarization, and a second kernel for modulating light of a second polarization, and a polarization combiner for merging light from the kernels into a dual polarization modulated output beam.

30 Claims, 7 Drawing Sheets

PROJECTION ENGINE

BACKGROUND OF THE INVENTION

1. Technical Field of the Invention

The present invention relates generally to light engines for projection display devices, and more particularly to an improvement that takes advantage of color switching and/or both polarizations of light generated by their light sources.

2. Background Art

Figure 1:
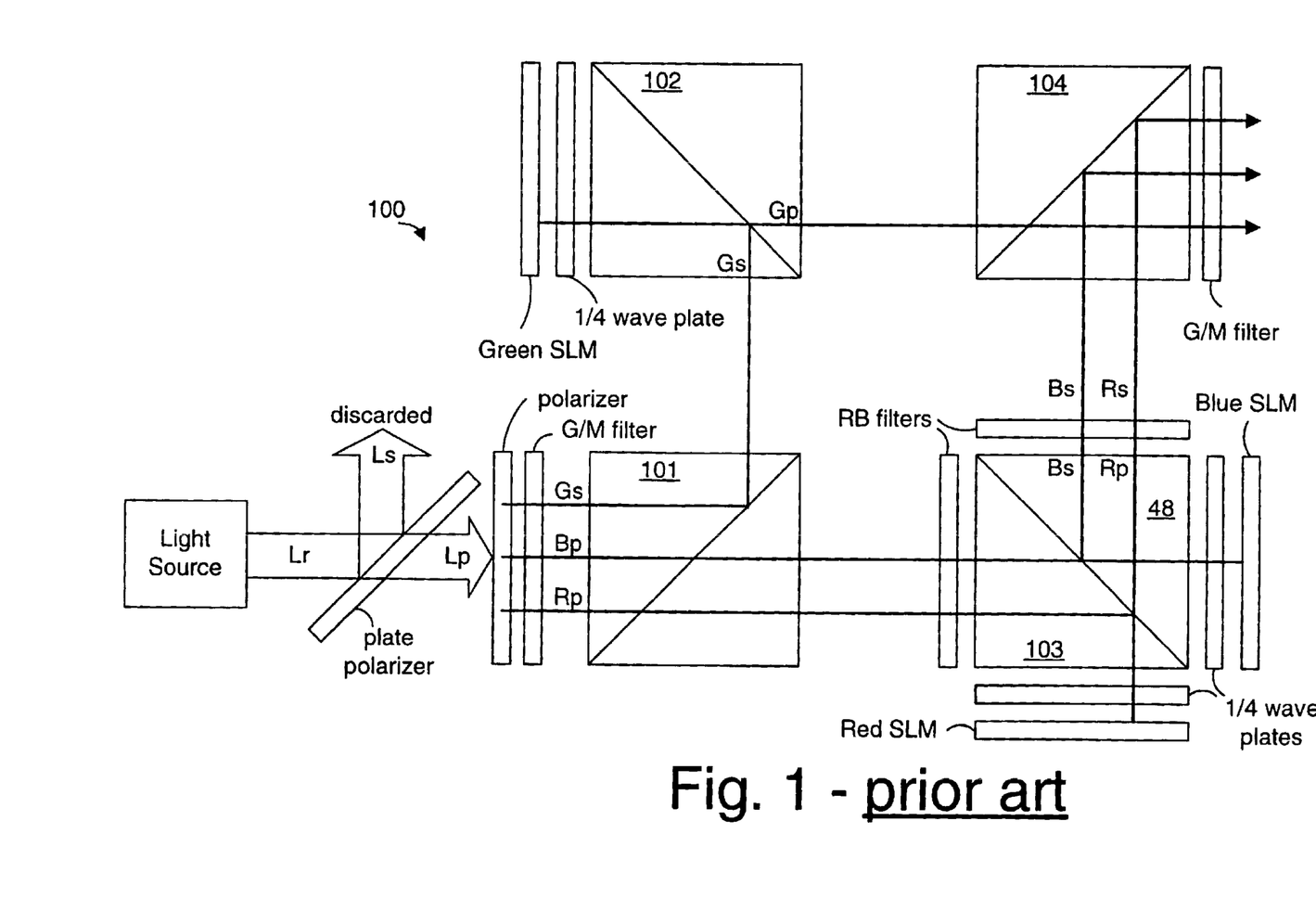
FIG. 1 shows a light engine kernel according to the prior art.

FIG. 1 illustrates a light engine kernel according to the prior art. It includes four polarization beam splitters (PBS's) 101–104 and three spatial light modulators (SLM's), as well as a number of polarizers and filters as needed. A PBS is typically constructed as a cube of glass made from two prisms with an optical coating on their mating surfaces which reflects incoming "S" polarized light and passes incoming "P" polarized light. An SLM is a multi-pixel opto-electronic device that modulates the intensity of light that is imaged to its pixels, by reflecting (or in some embodiments by transmitting) controllable amounts of light independently at each pixel. One embodiment of an SLM is constructed as a liquid crystal on silicon (LCOS) microdisplay. Other embodiments may be constructed as liquid crystal displays (LCD's), digital mirror devices (DMD's), grating light valves (GLV's), or other suitable technologies.

The light engine kernel 100 of FIG. 1 receives an incoming light beam Lr which has been pre-polarized and pre-filtered into color bands such as those suitable for use in a red-green-blue (RGB) color space. Let the notation "Xy" denote color (X) and polarization (y). The pre-polarization serves to reflect the s polarization of the incoming light (Ls) back to the light source (or for a PBS polarizer redirects it into an absorber). The GM filter serves to rotate the polarization state of the light in the green band Gp to the s polarization state Gs, while leaving the polarization of the light in the blue and red bands unchanged Bp, Rp. The incoming light arrives at the first PBS 101 which reflects the Gs component upward and passes the Bp and Rp components of the incoming light. The green Gs light arrives at the second PBS 102, which reflects the Gs light onto the Green SLM which modulates the Gs light to insert the green component of the image to be displayed. After passing once through the quarter-wave plate in each direction, the Gs light will have been repolarized to Gp, which the second PBS 102 will pass to the fourth PBS 104.

The Bp and Rp components are passed from the first PBS to the third PBS 103, which passes the Bp light through to a Blue SLM and reflects the Rp light to a Red SLM. After being repolarized by the quarter-wave plates, the blue light is reflected and red light is passed to the fourth PBS.

The fourth PBS 104 recombines the green beam with the red/blue beam, to form an output beam.

One disadvantage of this system is that it requires the discarding of one polarization of the input beam. Typically, half of the light source's output is discarded. This reduces the intensity of the output beam and thus the brightness of the image on the screen.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figure 2:
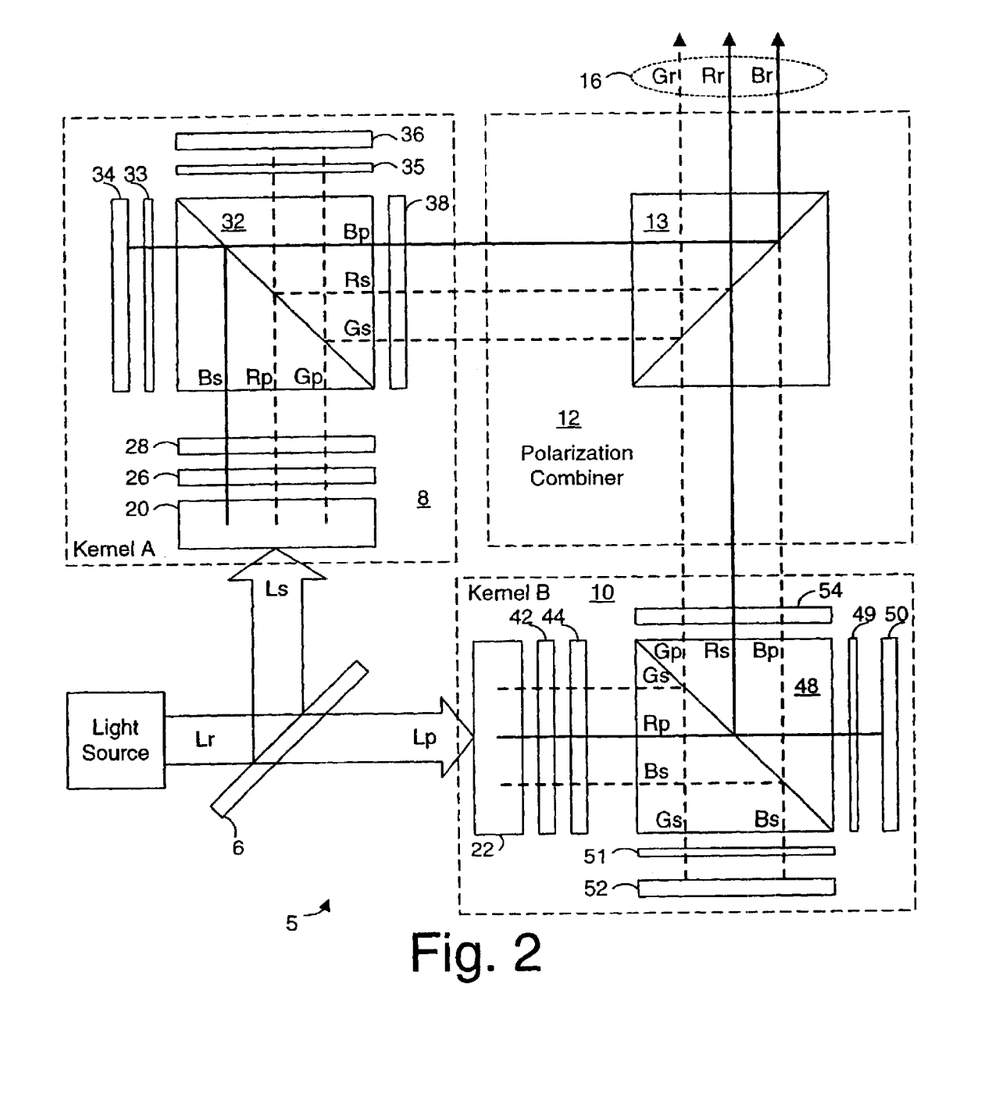
FIG. 2 shows a projection engine according to one embodiment of the invention.

FIG. 2 illustrates one embodiment of a two-kernel dual polarization projection engine 5 constructed according to the principles of this invention. The projection engine includes a polarization separator 6, a first light engine kernel 8 (Kernel A), a second light engine kernel 10 (Kernel B), and a polarization combiner 12. In one embodiment, the polarization separator is built using a first plate polarizer, the first and second kernels are built using first and second PBS's 32, 48 respectively, and the polarization combiner is constructed using a third PBS 13.

Input light 14 from a light source (Light Source) may be pre-filtered (by conventional means not shown) to substantially eliminate the infrared and ultraviolet, but substantially all of the light in the visible portion of the spectrum may be retained in the input beam rather than being discarded. Thus, the input beam Lr may include randomly polarized components Gr, Rr, and Br (not shown). The polarization separator reflects the S components Ls to the first kernel and passes the P components Lp to the second kernel. The skilled reader will appreciate that other permutations are achievable.

Kernel A is illustrated as a complete, two-panel system, meaning that it is equipped to modulate all three colors. A color switch 20 alternately blocks each of two of the colors, and in some embodiments may switch at a frequency of at least 120 Hz. In the mode shown, the color switch 20 switches the red and green components, while the blue component is not switched. For ease of illustration, switched light components are indicated by dashed lines, while non-switched components are indicated by solid lines. After passing through the switch, the light may pass through a filter and clean up polarizer 26, 28. Those of skill in the art will readily appreciate that various filters and polarizers can be selected to optimize the light engine kernel performance depending on choices in PBSs and SLMs.

The S polarized light Ls reflected from the polarization separator enters the PBS 32 of the first kernel, where the non-switched (blue) component Bs is reflected by the PBS through a quarter-wave plate 33 to a first SLM 34 (the blue SLM). The first SLM modulates the non-switched component to insert image content for that color and reflects it back through the quarter-wave plate to the PBS. The two transits of the blue component through the quarter-wave plate convert it from S to P polarization. The modulated blue light Bp then passes back through the PBS toward the polarization combiner 12. The switched components (red and green) Rp, Gp are, during their respective switching periods, passed through the PBS 32, through a quarter-wave plate 35, and then to a second SLM 36 (the red/green SLM). The second SLM is coordinated with the switch, to modulate the light color passed by the switch and insert image content for that color, during that color's switching period. The modulated light from the second SLM is reflected by the SLM through the quarter-wave plate into the PBS. The two transits of the red or green light through the quarter-wave plate convert their polarization from P to S, yielding Rs and Gs. The PBS reflects the modulated and multiplexed Rs and Gs components toward the polarization combiner. Thus, at any given moment, the output of Kernel A includes a modulated non-switched component of a first color (blue), and a modulated, switched component of one of the other colors (red or green). This beam may be passed through filters and polarizers as needed, as illustrated generally as 38.

The skilled reader will appreciate that the color space, the number of colors, and the selection of a non-switched color (if any) may be selected according to the needs of the particular application, and that the particular colors etc. described here are by way of teaching only.

Back at the polarization separator 6, the P components are passed to the second kernel 10 (Kernel B), where they pass through a second switch 22. This switch is operated very much like the first switch of Kernel A. It is not, however, necessary for the same color to be the non-switched color in both kernels. As shown, red is the non-switched color in Kernel B, and is passed through a second PBS 48 to a quarter-wave plate 49 and then to a third SLM 50 (red SLM), which modulates the red light. The switched color components (green and blue) are reflected by the second PBS through a quarter-wave plate 51 to a fourth SLM 52 (green/blue SLM) which modulates the light to insert green image content and blue image content during their respective switching periods. The modulated green and blue light are passed through the PBS to rejoin the non-switched red light. The second kernel includes filters and polarizers as needed, generally illustrated as 42, 44, and 54, and the skilled person will readily understand how to select and place them to meet the needs of the particular application.

The modulated light from the first and second kernels arrive at the polarization combiner 12, where they are combined to emerge as the modulated output beam 16 containing both polarizations' light components.

Figure 3:
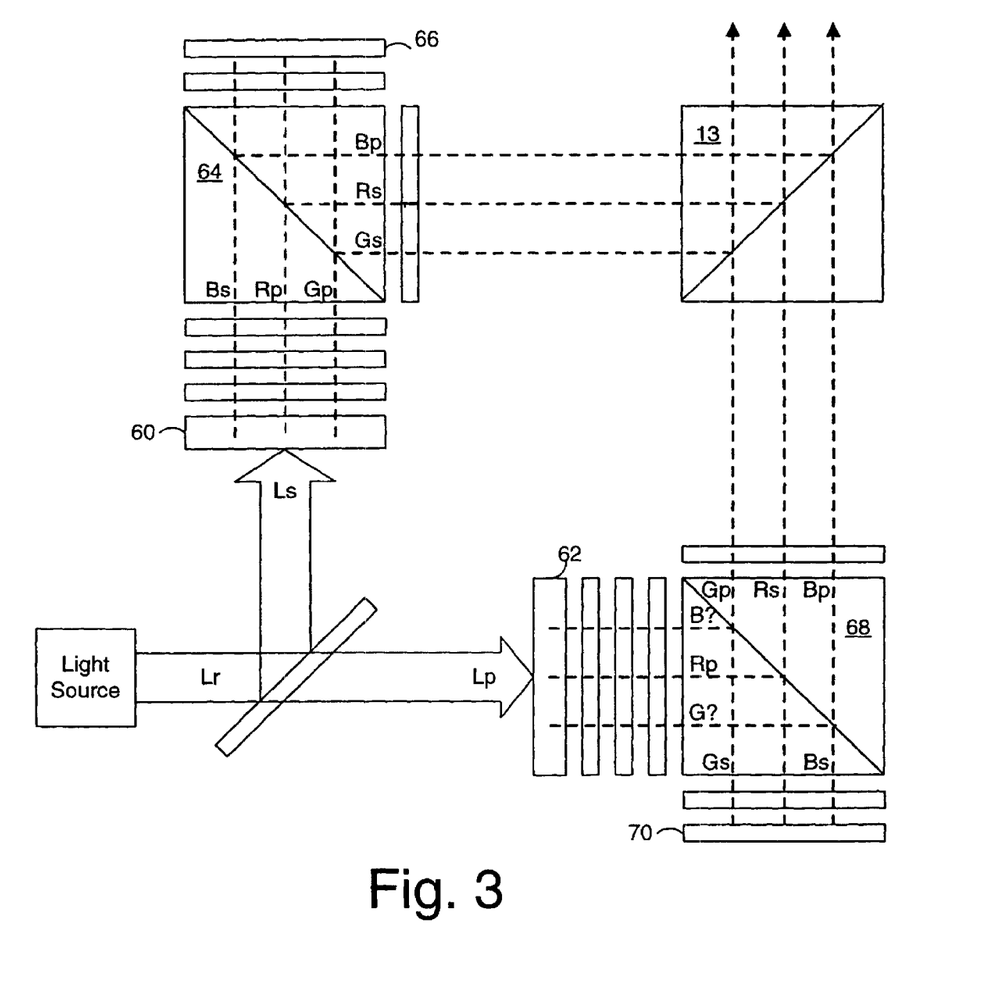
FIG. 3 shows another embodiment of a projection engine according to the invention.

FIG. 3 illustrates another embodiment of a two-kernel dual polarity projection engine, which differs from that of FIG. 2 in that it uses three-color switches 60 and 62 rather than two-color switches, and it uses only a single SLM 66 and 70, respectively, in each of its two kernels. The three-color switch and single SLM may typically be operated at a frequency above 180 Hz, in some applications.

Those skilled in the art will appreciate that the four-panel (four-SLM) projection engine of FIG. 2 and the two-panel projection engine of FIG. 3 could be combined, yielding a three-panel projection engine. In such an embodiment, the one panel kernel could operate in a non-switched manner on one color, or in a switched manner for either two or three colors.

Figure 4:
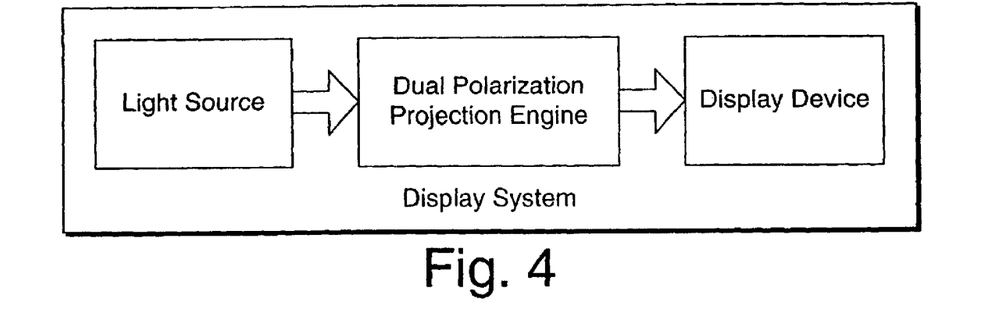
FIG. 4 shows a display system constructed according to the invention.

FIG. 4 illustrates a display system constructed using a dual polarization projection engine according to the teachings of this invention. The display system includes one or more light sources, a dual polarization projection engine, and a display device. The light sources may be any suitable form of light source, as indicated by the application. For example, the light sources may be arc or plasma lamps, lasers, light emitting diodes, or such. The display device may be any suitable form of display, such as a rear- or front-projection screen, a heads-up display, or such.

Figure 5:
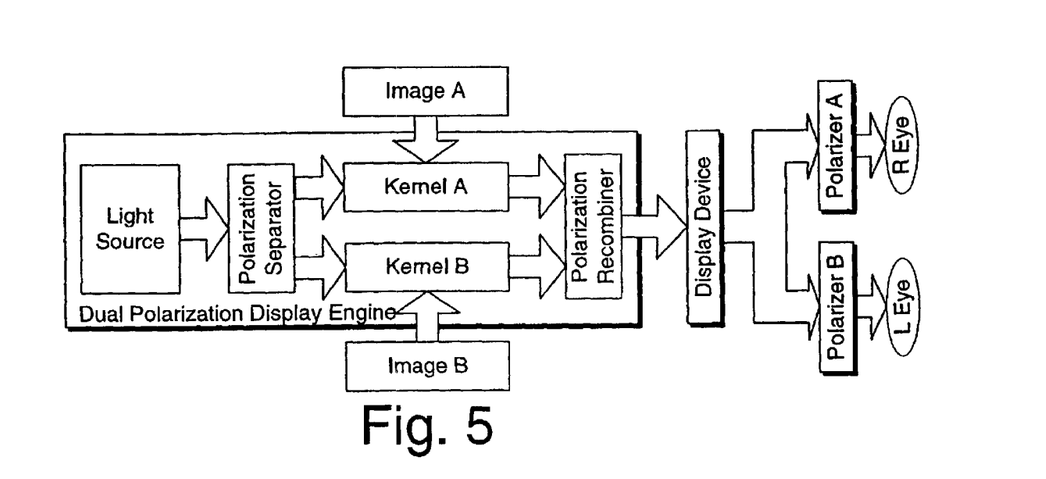
FIG. 5 shows a 3-D display system constructed according to the invention.

FIG. 5 illustrates a different embodiment of the dual-polarization, two-kernel projection engine, especially adapted for 3-D imaging. As with other embodiments, the projection engine may optionally include a light source integrally constructed with the rest of the projection engine, or the light source may be separate. Light from the light source is provided to a polarization separator. A 3-D image typically includes a left-eye image and a right-eye image which, when displayed only to their respective eyes, are interpreted by the human brain as a three-dimensional image. This may be a still image, or it may be a moving image. The right-eye image data, Image A, is provided to Kernel A, and the left-eye image data, Image B, is provided to Kernel B. The kernels inject this content, such as via SLMs (not shown), and the resulting beams are provided to a polarization recombiner which combines them into a single output light beam including both polarizations. This output beam is sent to a display device. Then, by viewing through suitable polarization filters Polarizer B and Polarizer A, respectively, one of which is S polarized and the other of which is P polarized, the left eye and the right eye receive only their respective one of the two images of the 3-D image.

The skilled reader will appreciate various permutations of this 3-D embodiment, which are within the scope of this invention. For example, each kernel may be a two-panel or single-panel kernel, as above.

Figure 6:
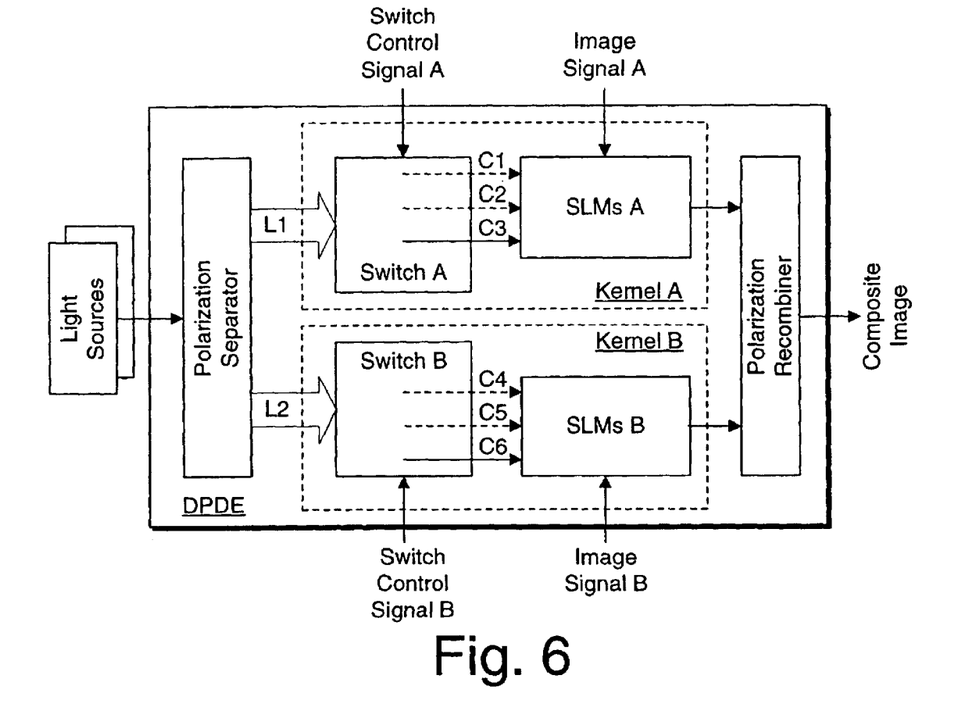
FIG. 6 shows a logical diagram of the projection engine of the invention.

FIG. 6 illustrates another embodiment of a composite-image application of the invention, as a dual polarization display engine (DPDE). Light from a light source is provided to a polarization separator, which sends light of a first polarization L1 to a first switch (Switch A) and light of a second polarization L2 to a second switch (Switch B). Switch A filters L1 into color bands C1–C3 and Switch B filters L2 into color bands C4–C6. Switch A receives a first switch control signal (Switch Control Signal A), controlling how it switches between at least two of the colors (e.g. C1 and C2). Switch B receives a second switch control signal (Switch Control Signal B), controlling how it switches between at least two of the colors (e.g. C4 and C5).

Light from the first switch is provided to the first kernel's (Kernel A) one or more first SLM's (SLMs A) which are fed by one or more image signals (Image Signal A). Light from the second switch is provided to the second kernel's (Kernel B) one or more second SLM's (SLMs B) which are fed by one or more image signals (Image Signal B). As above, more than two of the colors may be switched in any given switch, depending upon the number of colors (say N in Kernel A and Q in Kernel B) that the switch separates the incoming light into and the number of SLMS (say M in Kernel A and P in Kernel B) that are fed by that switch.

In some embodiments, the colors (C1–C3) utilized in the first kernel may be the same as the colors (C4–C6) utilized in the second kernel, but in different polarization. In some embodiments, there may be only a subset that are the same. In other embodiments, none are the same. In some embodiments, the sets of colors provided to the respective kernels are not in the same color space. For example, the colors C1–C3 may be in the RGB color space, while the colors C4–C6 may be in the CMY color space.

In some such dual-color-space embodiments, it may be undesirable to display both simultaneously. In such embodiments, one solution is to operate the switch and/or the SLMs of one kernel to effectively block all of the light in that color space.

The skilled reader will appreciate that the switches and/or SLMs may be operated in a non-binary manner. That is to say, a given color is not necessarily an all-or-nothing proposition. By adjusting the operation of a switch to selectively reduce the amount of light allowed through in each color band, a color may be color-balanced versus the other colors in its color space. Color balancing is well understood in the art of display systems. For example, many CRT based monitors allow the selection of a either a 5000° Kelvin, 6500° Kelvin, or 9300° Kelvin color temperature setting.

Figure 8:
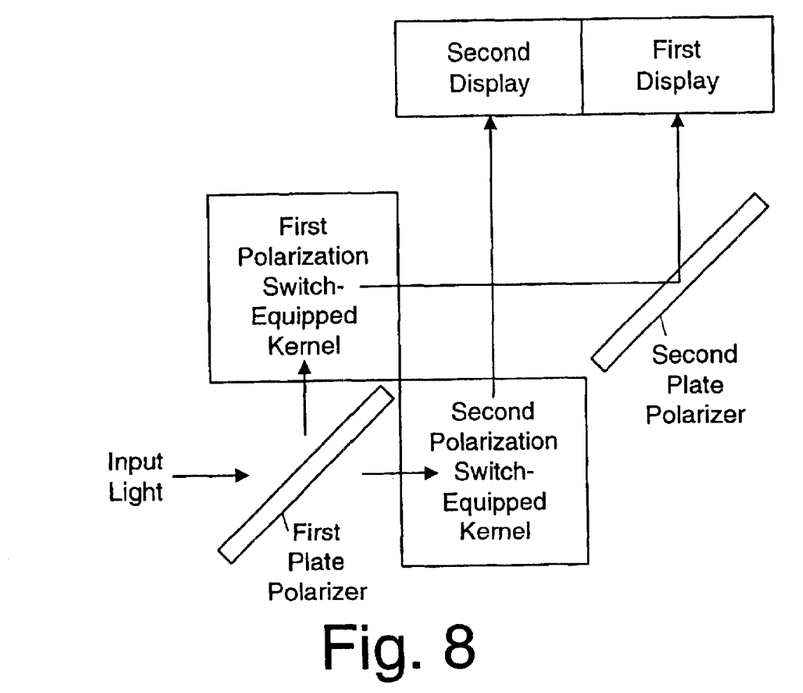

In some embodiments, the composite image may not be 3-D nor two color space. Rather, the two images may constitute different portions of a single, larger image, such as a left half and a right half. As shown in FIG. 8, in such embodiments, the polarization combiner does not overlay the beams, but tiles them.

FIGS. 7–11 illustrate various geometric configurations of the various components of the projection engine. The common theme in them is that each kernel substantially processes a different polarization of light with the same etendu and in a geometric configuration that allows substantially identical optical transformation and recombination or tiling into a final image.

Figure 7:
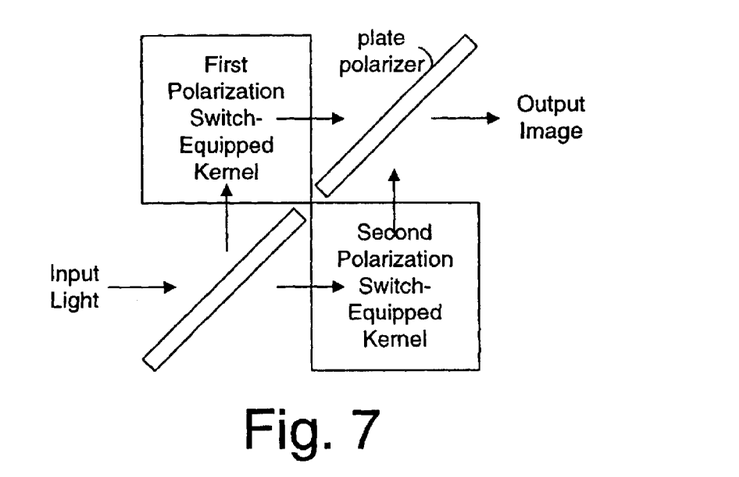
FIGS. 7–12 show construction diagrams of various embodiments of the invention.

FIG. 7 illustrates another embodiment in which, instead of the polarization combiner being a PBS, it is constructed as a second plate polarizer.

FIG. 8 illustrates another embodiment in which each kernel processes one half of the resulting image and tiles each of these images into a final larger image. In this case the SLMs on each kernel would have one half of the pixels of those in the embodiments described above. This could potentially reduce the size of the pixels, the size of the SLM, the size of the PBSs and plate polarizers, and thus the cost and complexity of the light engine. In this embodiment, there is no polarization combiner, and a reflective means such as a plate polarizer (second plate polarizer) is positioned to be outside the light path of the output of the second kernel. In this configuration, light from the first kernel is directed onto a first display and light from the second kernel is directed onto a second display. In most embodiments, there will be substantially no overlap and substantially no gap between the images on the first and second displays, to present a substantially seamless image. The first and second displays may be areas of a single, unitary display.

Figure 9:
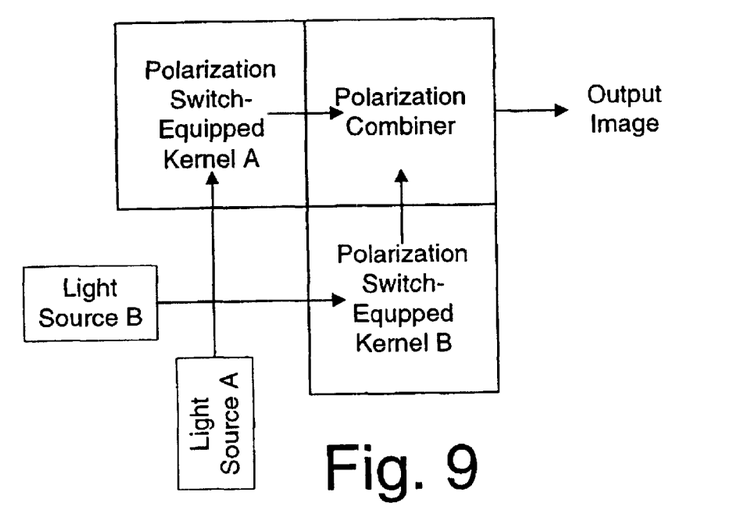

FIG. 9 illustrates, in a geometrically stylized format, one embodiment in which, rather than a polarization separator, a pair of light sources are used. Light from the first light source (Light Source A) has a first polarization and is directed to a first polarization switch-equipped kernel (Kernel A). Light from the second light source (Light Source B) has a second, different polarization and is directed to a second polarization switch-equipped kernel (Kernel B). The modulated output beams from the kernels are provided to different sides of a polarization combiner, which merges them into a dual polarization output image. In one such embodiment, the light beams from the light sources cross each other before entering their respective kernels. In other embodiments, they may not. For example, one or both of the kernels could be constructed to receive its input light at an outer surface rather than an inner surface. In such embodiments, the light source(s) would be positioned outside the structure, in a position opposite their illustrated position in FIG. 9.

Figure 10:
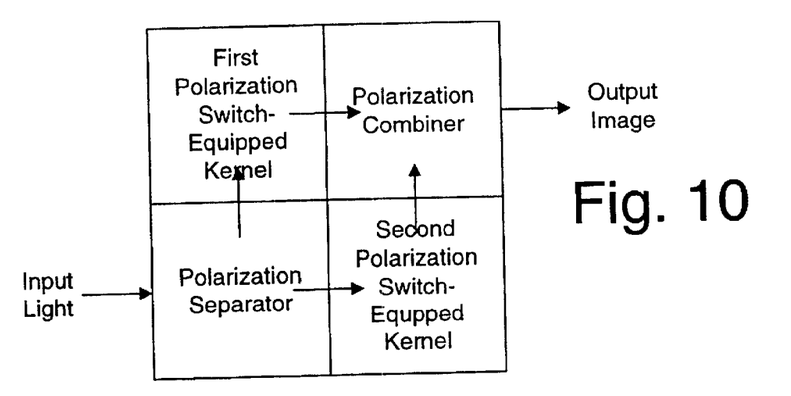

FIG. 10 illustrates geometry of another embodiment. The overall structure has a rectilinear (and preferably square) shape, with first and second polarization switch-equipped kernels at diagonally opposing corners, with the polarization separator and polarization combiner at the other corners. The light source (not shown) is external to this structure. The structure (including the various switches, filters, polarizers, and so forth) may be fabricated as a monolithic, integral unit. In one such mode, all four major components—polarization separator, two kernels, and polarization recombiner—are constructed as PBSs.

Figure 11:
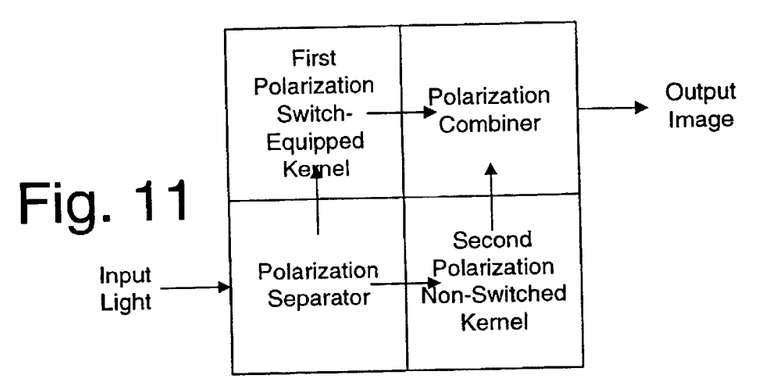

FIG. 11 illustrates another embodiment in which only one of the kernels is switched (meaning only one of the kernels has more colors than SLMs), while the other kernel is non-switched. Again, the kernels are at diagonally opposed corners of the generally rectilinear, and preferably square, overall shape. The non-switched kernel would have only one SLM and would utilize only one of the colors used in the switched kernel. In some such embodiments, the non-switched kernel may operate on a weaker color, or one whose intensity it is desired to boost by combining both polarizations at the output.

Figure 12:
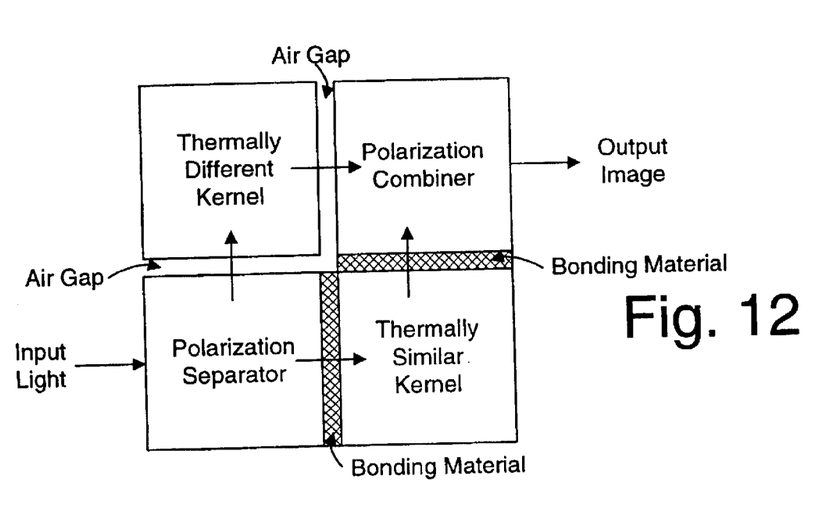

FIG. 12 illustrates another embodiment in which the overall structure is not constructed as a monolithic unit. Such an embodiment may be desirable in applications in which the four basic blocks (polarization separator, two kernels, and polarization combiner) behave differently with respect to heat. For example, in the embodiment shown, one of the kernels (Thermally Similar Kernel) has e.g. thermal expansion properties which sufficiently match those of the polarization separator and the polarization combiner, while the other kernel (Thermally Different Kernel) does not. If these four were bonded together into one monolithic whole, there might be unwanted mechanical stresses as the structure heated up under use, which could, for example, damage one of the PBS's or SLM's or switches. In order to mechanically isolate the different unit, it is left surrounded by an air gap, permitting it to expand and contract on its own, while the others are joined with a suitable bonding material for mechanical strength and reliable alignment. The reader will appreciate that any or all of the blocks could be separated by air gaps, not necessarily one of the kernels.

While, for the sake of clarity and explanation, the various aspects of the invention have been described and shown with reference to specific embodiments, the skilled reader will appreciate that various details thereof may be modified within the scope of the invention. For example, in some applications it may be desirable to have a two-panel kernel which switches all three colors, such as by switching one SLM between blue and red and the other between green and red, such that red is continuously imaged, on alternating SLMs in turn, for increased brightness in the red.

And while the invention has been described in terms of human-visible light, it may certainly be practiced in other electromagnetic wavelengths.

While the invention has been described as switching between colors at a 50:50 duty cycle and then using other means to perform color balancing, the color balancing could instead be done by adjusting the duty cycle. In such embodiments, the "non-switched" color could in fact be switched—not against another color, but against no color, simply to reduce its SLM time and perceived intensity.

Although the various embodiments have been described above as having at least one switched kernel, there is at least one application in which no switching is required. If there exists at least one color which is present, in different polarizations, in both kernels, and the polarization combiner overlays the kernels' output beams, the intensity of that at least one color is substantially doubled. It is believed that in the prior art, there was no case in which a same color was handled by both of the "kernels" (including the cases where a polarization's path involved less than a complete kernel).

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. An apparatus comprising:
   a polarization separator;
   a first polarization beam splitter optically coupled to a first output light path of the polarization separator;
   M≧1 first spatial light modulators optically coupled to the first polarization beam splitter to modulate light of N≧1 colors of a first color space;
   a second polarization beam splitter optically coupled to a second output light path of the polarization separator;
   P≧1 second spatial light modulators optically coupled to the second polarization beam splitter to receive light of Q≧1 colors of a second color space; and
   a polarization combiner optically coupled to the first and second polarization beam splitters.

2. The apparatus of claim 1 wherein M=2.

3. The apparatus of claim 2 wherein P=2.

4. The apparatus of claim 1 further comprising:
   first color switch coupled between the polarization separator and the first polarization beam splitter; and wherein
   N>M.

5. The apparatus of claim 4 further comprising
   a second color switch coupled between the polarization separator and the second polarization beam splitter; and wherein
   Q>P.

6. The apparatus of claim 1 further comprising:
   means for preventing the light of N colors and the light of Q colors from entering the polarization combiner simultaneously.

7. The apparatus of claim 1 further comprising:
   means for providing data representing one image of a 3-D composite image to the first spatial light modulators; and
   means for providing data representing another image of the 3-D composite image to the second spatial light modulators.

8. An apparatus comprising:
   a first light engine kernel to insert content in each of three colors in a first color space;
   a second light engine kernel to insert content in each of three colors in a second color space; and
   a combiner optically coupled to outputs of the first and second light engine kernels.

9. The apparatus of claim 8 wherein:
   the first and second light engine kernels include one spatial light modulator each.

10. The apparatus of claim 8 wherein:
    the first and second light engine kernels include two spatial light modulators each.

11. The apparatus of claim 8 wherein:
    the first light engine kernel includes exactly one spatial light modulator; and
    the second light engine kernel includes exactly two spatial light modulators.

12. The apparatus of claim 8 wherein the first light engine kernel comprises:
    a polarization beam splitter;
    a first spatial light modulator optically coupled to the polarization beam splitter;
    a second spatial light modulator optically coupled to the polarization beam splitter; and
    a first optical switch optically coupled to the polarization beam splitter.

13. The apparatus of claim 12 wherein the first light engine kernel further comprises:
    means for operating the first optical switch to pass light of a first color during a first period of time, and to pass light of a second color during a second period of time; and
    means for operating one of the spatial light modulators to insert content of the first color during the first period of time, and to insert content of the second color during the second period of time.

14. The apparatus of claim 13 wherein:
    the third color is provided to another of the spatial light modulators in a non-switched manner.

15. The apparatus of claim 13 further comprising:
    means for operating the first optical switch to allow selection of an amount of light of at least one of the first, second, and third colors accepted by one of the spatial light modulators.

16. The apparatus of claim 12 wherein:
    the first and second spatial light modulators are mechanically coupled to the polarzation beam splitter.

17. The apparatus of claim 8 further comprising:
    a polarization separator coupled to direct light of a first polarization to the first light engine kernel and light of a second polarization to the second light engine kernel.

18. The apparatus of claim 8 wherein:
    the first and second color spaces are a same color space.

19. The apparatus of claim 8 wherein:
    one of the first and second color spaces is RGB color space; and
    another of the first and second color spaces is CMY color space.

20. An apparatus to receive input light and to provide output light, the apparatus comprising:
    means for spatially substantially separating the input light into first light having a first polarization and second light having a second polarization different than the first polarization;
    first means for inserting content into the first light, the first means for inserting including means for switching at least two color components of the first light, wherein the means for switching comprises a three-color switch;

second means for inserting content into the second light, the second means for inserting including means for switching at least two color components of the second light; and means for combining the content-inserted first and second light to create the output light.

21. The apparatus of claim 20 wherein:

the first and second means for inserting comprise, respectively, first and second polarization beam splitters.

22. The apparatus of claim 20 wherein:

the three-color switch is adapted to switch between red, green, and blue.

23. The apparatus of claim 20 wherein the three-color switch is adapted to switch between cyan, magenta, and yellow.

24. An apparatus to generate a light beam containing at least two 2-D images of a composite 3-D image, the apparatus comprising:

a first switched light engine kernel to provide first light, the first light having a first polarization and containing content representing a first of the 2-D images;

a second switched light engine kernel to provide second light, the second light having a second polarization and containing content representing a second of the 2-D images, wherein the second polarization is different than the first polarization; and a polarization combiner to combine the first light and second light to create the light beam.

25. The apparatus of claim 24 further comprising:

a polarization separator to separate an input light into the first light and the second light.

26. The apparatus of claim 25 wherein:

the polarization separator, the first and second switched light engine kernels, and the polarization recombiner are coupled in a substantially planar optical path.

27. The apparatus of claim 26 wherein:

the polarization separator, the first and second switched light engine kernels, and the polarization combiner are coupled in a substantially square arrangement, with the first and second switched light engine kernels at diagonally opposed corners.

28. The apparatus of claim 27 wherein:

the polarization separator, the first and second switched light engine kernels, and the polarization combiner are each substantially square in profile in the optical path, and are each proximally coupled to their neighbors.

29. An apparatus comprising:

a first plate polarizer to receive light from a light source, and substantially separate the light into first polarization light and second polarization light, and to substantially reflect one of and transmit an other of the first polarization light and the second polarization light;

a first color switch optically coupled to receive one (Lx) of the first polarization light and the second polarization light from the first plate polarizer;

a first polarization beam splitter optically coupled to receive switched light from the first color switch;

a first single spatial light modulator optically coupled to receive and modulate switched light from the first polarization beam splitter, and reflect the modulated switched light back to the first polarization beam splitter;

a second color switch optically coupled to receive an other (Ly) of the first polarization light and the second polarization light from the first plate polarizer;

a second polarization beam splitter optically coupled to receive switched light from the second color switch;

a second single spatial light modulator optically coupled to receive and modulate switched light from the second polarization beam splitter, and reflect the modulated switched light back to the second polarization beam splitter; and a second plate polarizer optically coupled to receive modulated light from the first polarization beam splitter and modulated light from the second polarization beam splitter and combine the modulated lights into an output beam.

30. The apparatus of claim 29, wherein the first color switch and the second color switch are coupled to operate in different color spaces.

* * * * *

UNITED STATES PATENT AND TRADEMARK OFFICE
CERTIFICATE OF CORRECTION

| | | |
|---|---|---|
| PATENT NO. | : 6,672,722 B2 | Page 1 of 1 |
| APPLICATION NO. | : 09/885231 | |
| DATED | : January 6, 2004 | |
| INVENTOR(S) | : Michael O'Connor, Kenneth E. Salsman and Serge Rutman | |

It is certified that error appears in the above-identified patent and that said Letters Patent is hereby corrected as shown below:

<u>Column 10</u>:

Line 43, add the following claims:

31.    An apparatus comprising:
            a polarization separator;
            a first light engine kernel optically coupled to receive light of a first polarization from the polarization separator;
            a second light engine kernel optically coupled to receive light of a second polarization from the polarization separator, wherein the second polarization is different than the first polarization; and
            a reflector optically coupled to receive content modulated light from the first light engine kernel and spatially positioned to tile the received light with light output from the second light engine kernel.

32.    The apparatus of claim 31 wherein:
            the polarization separator comprises a plate polarizer.

33.    The apparatus of claim 32 wherein:
            the reflector comprises a plate polarizer.

Signed and Sealed this

Twenty-ninth Day of January, 2008

JON W. DUDAS
*Director of the United States Patent and Trademark Office*